Dec. 31, 1957 C. J. KLEIN 2,818,183
CHARGING OPEN HEARTH FURNACES
Filed Aug. 1, 1951 5 Sheets-Sheet 1

INVENTOR
CLARENCE J. KLEIN
BY
ATTORNEY

Dec. 31, 1957  C. J. KLEIN  2,818,183
CHARGING OPEN HEARTH FURNACES
Filed Aug. 1, 1951  5 Sheets-Sheet 2

INVENTOR
CLARENCE J. KLEIN
BY
ATTORNEY

Dec. 31, 1957     C. J. KLEIN     2,818,183
CHARGING OPEN HEARTH FURNACES

Filed Aug. 1, 1951     5 Sheets-Sheet 3

INVENTOR
CLARENCE J. KLEIN
BY
ATTORNEY

Dec. 31, 1957 C. J. KLEIN 2,818,183
CHARGING OPEN HEARTH FURNACES
Filed Aug. 1, 1951 5 Sheets-Sheet 5

INVENTOR
CLARENCE J. KLEIN
BY
ATTORNEY

United States Patent Office 2,818,183
Patented Dec. 31, 1957

2,818,183

CHARGING OPEN HEARTH FURNACES

Clarence J. Klein, Marland Heights, W. Va., assignor to National Steel Corporation, a corporation of Delaware Application August 1, 1951, Serial No. 239,737

7 Claims. (Cl. 214—29)

The present invention relates to an improved charging car for charging material into an open hearth furnace and relates to an improved open hearth plant including the improved charging car.

Attention is called to the copending applications assigned to the assignee of the present application. The copending applications are: Serial No. 239,804 filed August 1, 1951 and now Patent No. 2,765,934 by W. H. Wright and J. M. Bendot, entitled, "Charging Car and Open Hearth Plant Including Same," and application Serial No. 239,783, filed August 1, 1951 and now Patent No. 2,757,925 by C. E. Carr, entitled "Open Hearth Furnace Charging."

In open hearth plants of customary construction, there is a long series of open hearth furnaces arranged end-to-end in a line extending down the middle of the open hearth building. Each open hearth furnace has on one side a number of relatively small charging doors through which raw materials are charged into the hearth of the open hearth furnace. The floor extending along the front of the charging side of the furnace is commonly referred to as the charging floor, and the pouring floor extends along the opposite side of the line of furnaces so that the raw materials are charged into the furnace from the charging floor and the finished steel is tapped from the furnaces into ladles located on the pouring floor. On the charging floor, there is a wide gauge track spaced from but extending parallel to the row of open hearth furnaces. On this wide gauge track, there is mounted at least one charging machine. The charging machine includes a lower carriage or truck having flanged wheels mounted on the rails of the wide gauge track so that the charging machine is movable along this track into alignment with the furnace to be charged. A second carriage is mounted on and is movable back and forth along upper rails extending across the lower truck, and this upper charging carriage carries a peel which is tiltable upwardly and downwardly and which is also rotatable. Thus, the peel is universely movable in a horizontal plane and is tiltable upwardly and downwardly so that the outer end of the peel can be raised or lowered. Between the wide gauge track and the open hearth furnace, there is a relatively narrow gauge track which extends along the row of furnaces and connects with other rails extending out into the stock yard of the plant. Charging cars or buggies, each supporting a number of small charging boxes, are mounted on these rails. The charging boxes are loaded in the yard and then the cars are moved along the rails into position adjacent the open hearth furnace which is to be charged. Each buggy supports a plurality of charging boxes, and each charging box holds a small amount of material—for example, a ton of solid scrap metal. After the buggy and charging machine have been moved into place, the operator of the charging machine, while positioned at the controls of the charging machine, moves the peel outwardly so that the end of the peel engages a slot in the end of the charging box. The peel is turned to lock the end into engagement with the end of the box, and then the box is lifted and inserted through the doorway into the open hearth furnace. The box is then turned 180° to dump the charge into the furnace, after which the box is withdrawn and replaced on the buggy. This procedure is repeated many times until the open hearth furnace has been fully charged.

The iron ore, limestone and solid scrap metal are charged into the open hearth furnace in the manner described above with the scrap metal, which is usually scrap steel, constituting the largest item of solid raw material charged into the furnace. Many tons of scrap metal are charged into each open hearth furnace, and a long period of time extending over a number of hours is required to charge an open hearth furnace. This charging period is longer when relatively light weight scrap metal is charged. The tendency today is to increase the size of the open hearth furnaces, and with these larger furnaces the charging time is much longer, so that this method of charging is similar to using a teaspoon to fill a large container.

It is an object of the present invention to provide an improved charging car for charging a large quantity of solid material into an open hearth furnace in a short period of time.

Another object of the present invention is to provide an improved charging car including a large container that can be moved into the charging position and the contents of the container then pushed into the open hearth furnace in a single operation by the operator of the charging machine.

Another object of the present invention is to provide an improved charging car having a large charge holding container adapted to hold many tons of scrap metal and slidably mounted on the car for movement laterally outwardly so as to extend through the open hearth doorway and having a sidewall for the container that is movable across the container for pushing the entire charge from the container into the furnace in one operation.

Another object of the present invention is to provide an improved open hearth plant including an improved charging car and a charging machine with the car and machine being arranged to quickly charge the open hearth furnace in a novel manner.

In accordance with the present invention, I provide in the open hearth plant, which includes a series of aligned open hearth furnaces and at least one charging machine movable along along rails spaced from the line of open hearth furnaces, a charging car adapted to hold a large quantity of material. The charging car is movable along rails between the charging machine and the open hearth furnaces into position in alignment with the furnace to be charged. The furnace is provided with one or more relatively wide doors to accommodate the relatively long, large charging box which is slidably mounted on the charging car for movement toward and preferably through the charging door of the furnace by means of charging machine. This large container has at one side a movable sidewall which can be moved across the container by means of the charging machine peel to push the material out of the container and into the furnace. After this large quantity of material has been charged into the furnace, the charging machine retracts the container and the movable sidewall, and then another charging car can be quickly moved into position adjacent the furnace and the charge in the container quickly pushed into the furnace. With this arrangement, it is possible to charge a large open hearth furnace in a small fraction of the time usually required.

These and other objects and advantages of the present invention will become more apparent when considering the following description, taken with the accompanying drawings, in which.

Figure 1:
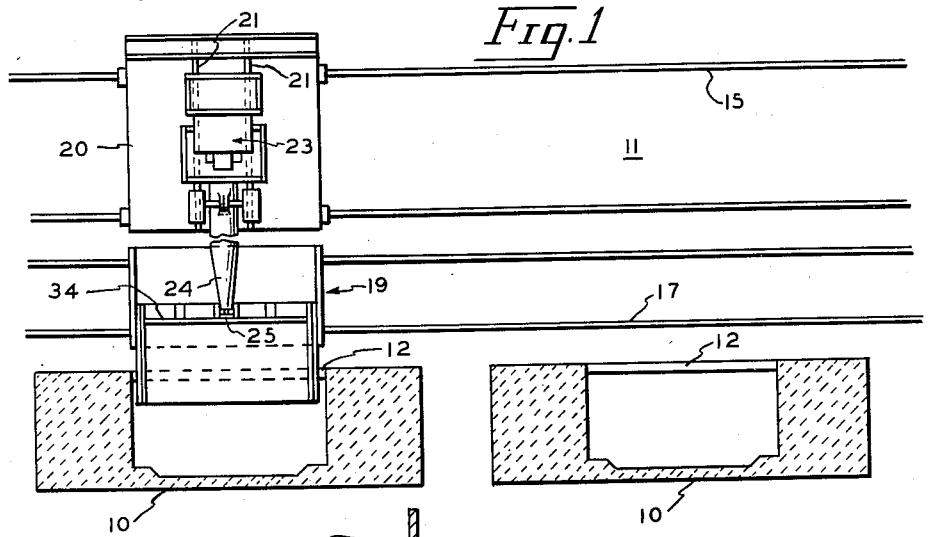
Figure 1 is a fragmentary schematic view illustrating a portion of an open hearth plant embodying the principles of the present invention.

Referring to the drawing, Figure 1 shows the pertinent portions of the open hearth plant which includes a series of open hearth furnaces 10 arranged in end-to-end relationship and extending in a line down the middle of the open hearth building (not shown) which may be of any suitable type. On one side of the open hearth furnaces, there is located the charging floor 11, and on the opposite side of the line of furnaces, there is located the pouring floor (not shown). Each furnace 10 is provided on the side toward the charging floor 11 with a relatively wide doorway 12, and this doorway is normally closed by means of a door 13, Figure 2, which can be raised to open the doorway and to permit the charging of the material into the furnace. The door may be of any suitable construction and may extend entirely across the doorway 12 or a plurality of doors may be used for closing the wide doorway 12.

As shown in Figure 1, there is on the charging floor a wide gauge track 15 on which is mounted the charging machine 16. A relatively narrow gauge track 17 is disposed between the track 15 and the open hearth furnaces 10. Especially in the larger mills, a number of similar charging machines are usually mounted on the track 15 and a number of charging cars 19 are provided on the narrow gauge track 17, as it is frequently necessary to be simultaneously charging more than one of the furnaces. Customarily, the narrow gauge track 17 connects with or extends out into the stock yard (not shown), so that the charging car can be loaded in the stock yard and then moved into the mill and onto the charging floor and then moved into alignment with the furnace to be charged. Before a furnace is charged, the charging machine 16 and the charging car 19 are moved into alignment with the furnace to be charged and then, as will be more fully hereinafter described, the operator of the charging machine actuates the charging machine peel to charge the material carried by the charging car into the open hearth furnace.

As shown, the charging machine includes a lower wheeled truck or carriage 20 mounted on track 15 for movement along the track. On this lower truck 20, there is mounted a pair of horizontal, laterally extending rails 21 which extend in a direction normal to the direction of track 15. An upper carriage 23 is mounted on the rails 21 and supports an outwardly extending peel 24. As the truck 20 is movable along rails 15 and carriage 23 is movable along rails 21, the peel 24 is universally movable in a horizontal plane. In addition, the peel is suspended so that it can be tilted to raise or lower the outer end 25 of the peel 24. These charging machines are widely used in steel mills and are well known to those skilled in the art. The charging machine may be of any suitable type.

As shown more clearly in Figures 1 to 6, the charging car 19 includes a carriage or frame 25 mounted on trucks 26 with each truck including flanged wheels 27 that engage the rails 17 so that the car is movable along the rails. The frame 25 includes a top plate 29. Four sets of identical rolls 31 are mounted on the carriage in bearings 32. Each set of rolls includes four rolls and, preferably, the rolls are grooved, as shown. A container 34 for holding the material to be charged into the furnace is mounted on the car and is normally positioned in the normal or retracted position shown in Figure 3, in full lines. On the bottom of the container, there is a V-shaped rail 36 for each set of rolls 31, and the container is laterally movable from the normal or retracted position to the charging position shown in Figure 2.

Figure 4:
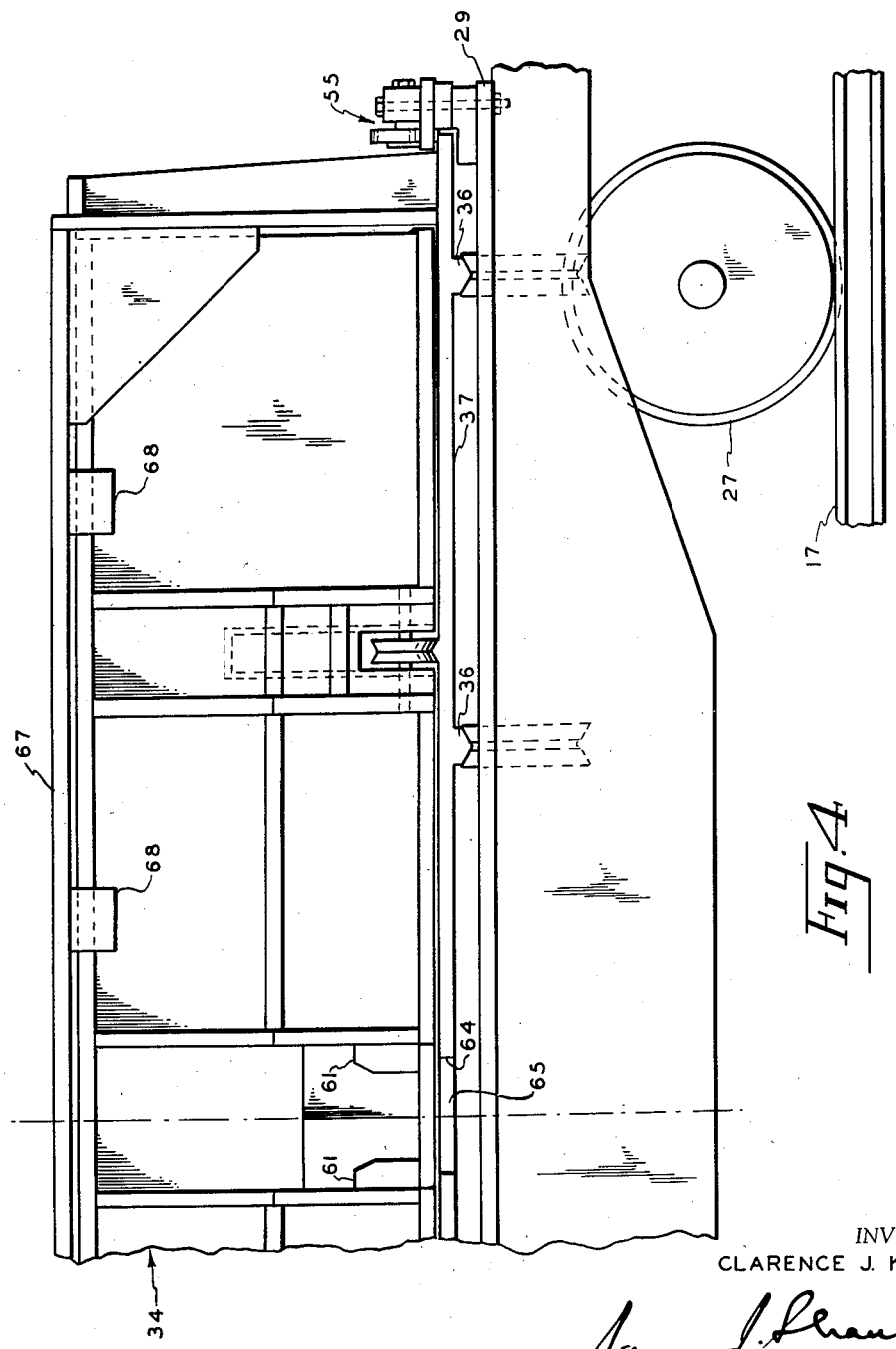
Figure 4 is a fragmentary rear elevational view of substantially one-half of the car of Figure 2.
Figure 5:
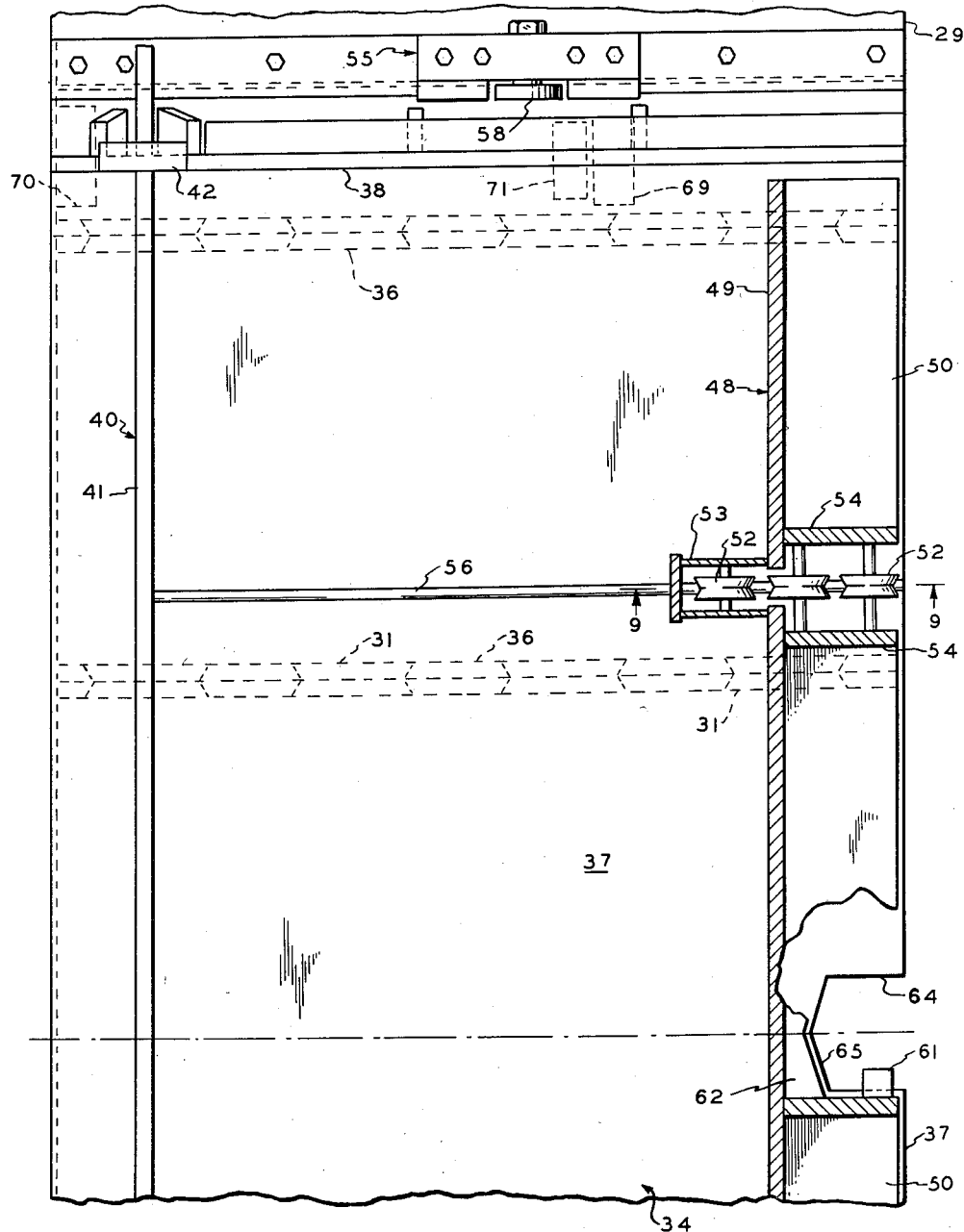
Figure 5 is a plan view of the portion of the car shown in Figure 4 with the movable wall being shown in section to illustrate better the construction.
Figure 6:
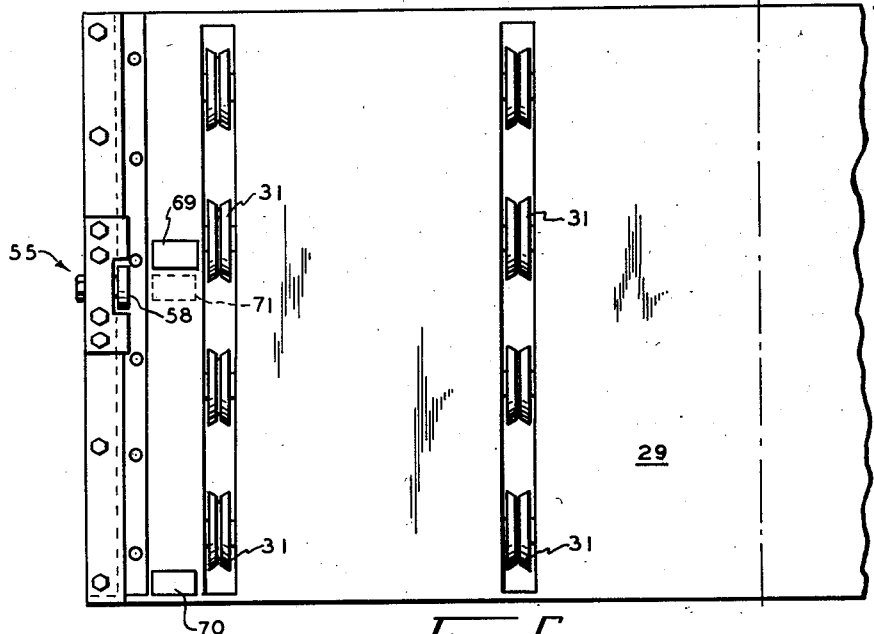
Figure 6 is a plan view of the portion of the car shown in Figure 5 with the container removed.

In Figures 4, 5 and 6, only one-half of the charging car is shown, it being understood that the other half of the charging car is identical with the half shown in the drawings. The container 34 includes a bottom wall 37 and at each end an upwardly extending end wall 38. Each end wall 38 may be fastened in place on the bottom wall 37 by any suitable means—for example, welding. On the side of the container facing the furnace, there is a removable side wall 40. The removable side wall 40 includes a plate 41 carrying adjacent each end a tapered wedge member 42, and in each end wall 38 there is a slot 43, and on the outside of the end wall adjacent the slot 43 there is a pair of angularly disposed members 44 and 45. The removable side wall structure 40 can be readily removed by means of the usual crane present in such plants and a portion of which is shown at 47, Figure 2, to permit charging of the material into the furnace. After the material has been charged into the furnace, the side wall 40 can be lowered into position with the plate 41 fitting into the slots 43 and the tapered members 42 fitting or wedging into the tapered space between members 44 and 45 so that the removable wall is firmly held in its normal position to prevent spillage as the car is moved along the rails. As shown, the wall 41 is spaced above the bottom plate 36, but, if desirable, the plate 41 may extend downwardly to the bottom plate of the container.

Figure 9:
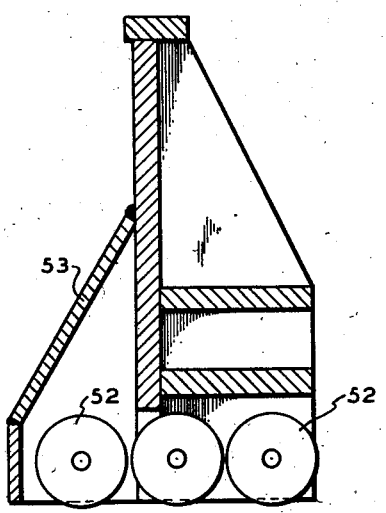
Figure 9 is a fragmentary sectional view taken along line 9—9 of Figure 5.

At the side of the container 34 away from the open hearth furnace, there is a movable wall 48. The wall 48 includes an upwardly extending wall or plate 49 and a horizontal lower wall 50. The vertical and horizontal walls 49 and 50 are connected by any suitable means, such as welding to present in cross section an L-shape. At each end of the movable wall 48, there are three grooved rolls 52 as shown in Figures 5 and 9. A cover or hood 53 extends forwardly from the movable wall to cover the forward roll 52, and this cover provides a support for the forward roll. The other two rolls 52 are rotatably mounted in bracing plates 54 at the rear of the movable wall. A guide or rail 56 extends across the top of the bottom wall 37, and the rolls 52 ride on this rail 56, so that the movable wall is guided during its movement across the container. Other means may be used for supporting the movable wall for movement laterally across the container.

Figure 2:
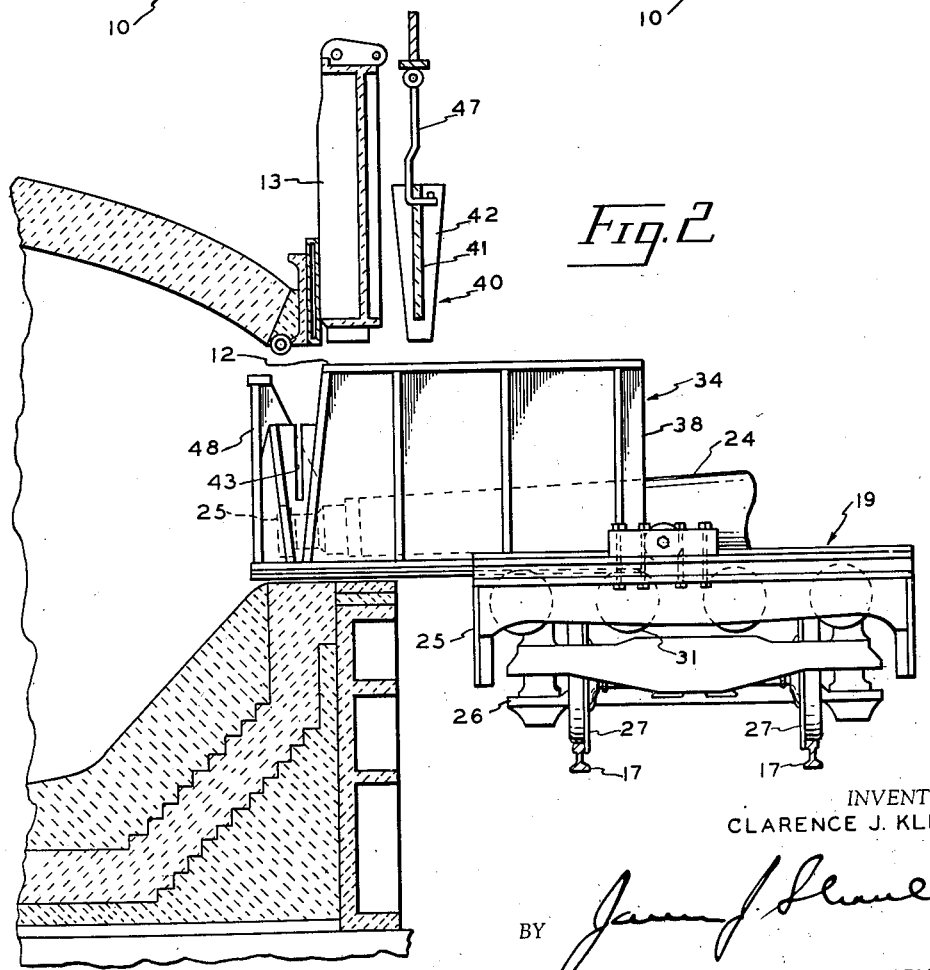
Figure 2 is an enlarged view in elevation showing a charging car embodying the principles of the present invention in the position assumed upon charging material into an open hearth furnace with portions of the furnace being shown in section to better illustrate the invention.
Figure 3:
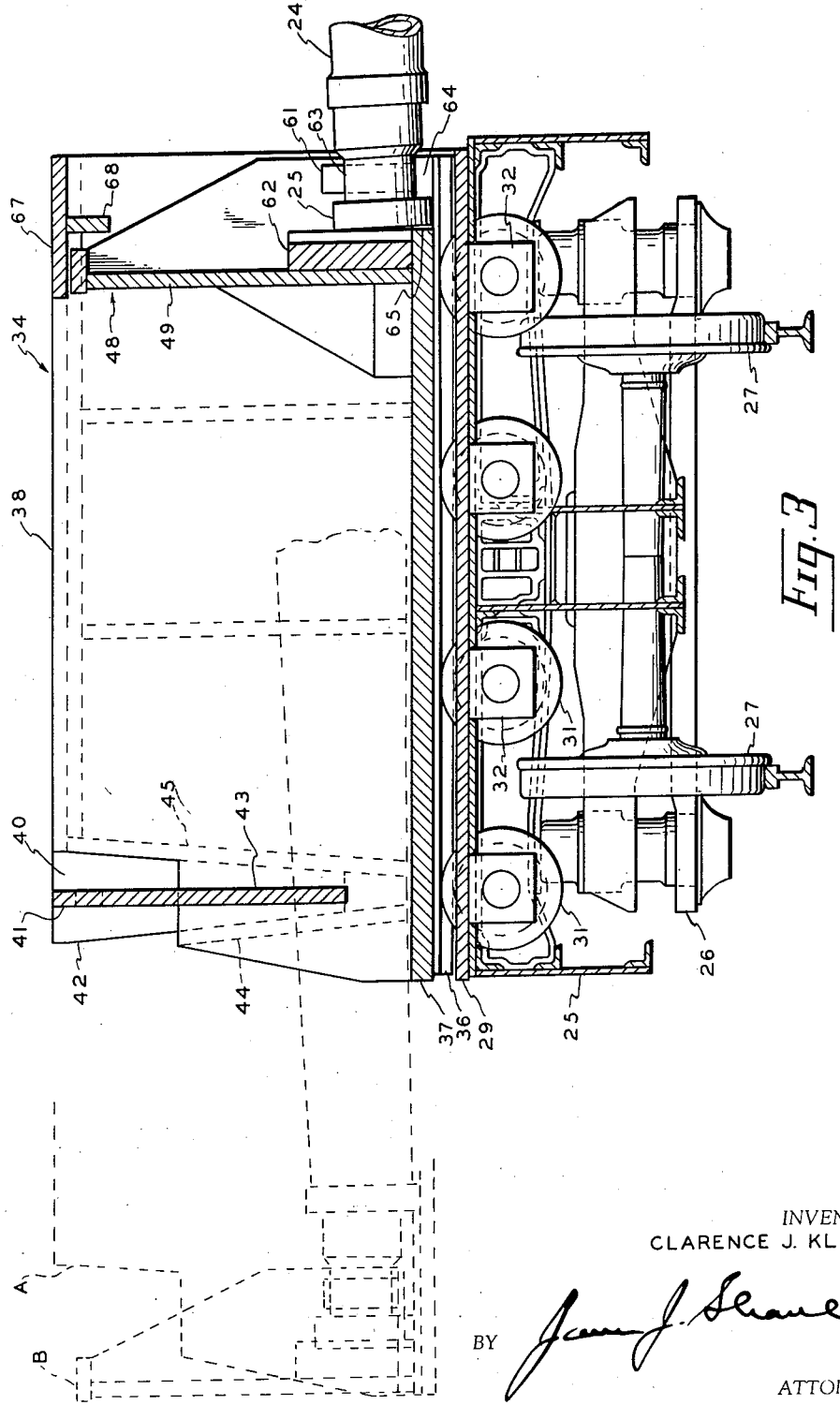
Figure 3 is an enlarged transverse sectional view of the charging car of Figure 2.
Figure 7:
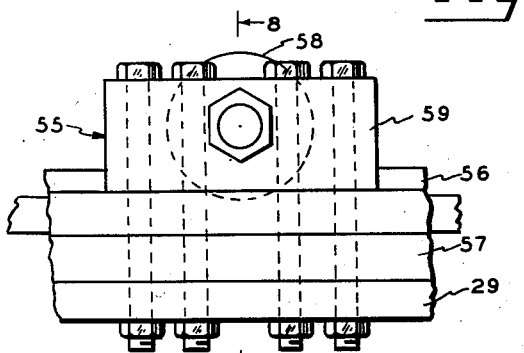
Figure 7 is an enlarged fragmentary view showing the hold-down means, also shown in Figs. 2, 4 and 6.
Figure 8:
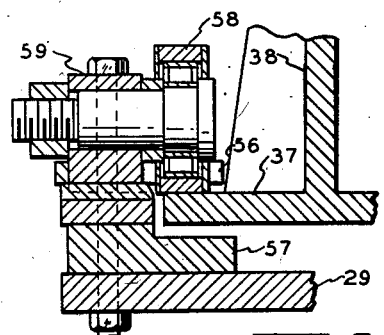
Figure 8 is a fragmentary sectional view taken along line 8-8 of Figure 7.

Referring particularly to Figures 8 and 7, the container 34 when moved from the normal position shown in Figure 3 to the charging position shown in Figure 2 overhangs the charging car. At each end of the container, there is a hold-down means 55 for preventing tilting of the container. A pair of spaced rails or guides 56 and 57 are mounted on the car frame at each end of the container and an end portion of the bottom container wall 37 extends between these rails. The upper surface of the wall 37 is engaged by a roll 58 rotatably mounted in a bearing block 59. The rails 56 and 57 are disposed above and below the end of the wall 37 and normally do not engage the container. These rails or bars provide a safety means, in addition to the roll 58, for preventing tilting of the container.

Both the container 34 and the movable wall 48 are provided with means for engaging the end 25 of peel 24, so that the peel of the charging machine is utilized to move the movable wall and the container to the charging position and vice versa. On the back of the movable wall and at the center of the wall, there is a pair of vertically-spaced apart bars 61. A plate 62 is mounted on the back of plate 49 and the plate 62 and bars 61 are spaced so that the head 25 of the peel 24 fits between these members with the bars 61 being spaced closely to the neck 63 on the peel in back of the head. Thus, the end of the peel can be lowered between the plate 62 and bars 61 to engage the movable wall for moving the wall toward the furnace and for moving the wall away from the furnace. The bottom wall 37 of the container is notched at 64 so that the peel, when positioned with the head 25 between members 62 and 61, can be lowered to engage the edge 65 of notch 64. With the end of the peel lowered so as to engage the notch edge 65 as shown in Figure 3, movement of the peel to the left moves the container 34 to the left and to the charging position as indicated in broken lines at A. When the container has been moved to the charging position or position A, then the end of the peel is raised out of engagement with the container, but is retained in engagement with the movable wall, so that further movement of the peel to the left moves the movable wall 48 across the container to push the charge into the furnace. Pushing the charge into the furnace moves the movable wall 48 to the position indicated in broken lines at B on Figure 3.

At the same side of the movable container as the movable wall 48, there is an upper horizontal plate 67 from which there depends a plurality of stops 68. The stops 68 are positioned so that when the movable wall is moved relative to the container and toward the right the wall engages the stops 68. After the charge has been pushed into the furnace, retraction of the peel moves the movable wall toward the right and into engagement with the stops 68. Further movement of the peel toward the right moves the wall and container together back to the retracted position shown in full lines in Figure 3.

Stops are provided for limiting movement of the container relative to the frame 25. As shown more fully in Figures 5 and 6, there is adjacent each end of the container a pair of spaced apart fixed stops 69 and 70 mounted on the top plate 29 of the car frame. A cooperating stop 71 is mounted on the bottom of wall 37 so as to extend between the stops 69 and 70. The position of stop 71 when the container is in the normal or retracted position is indicated in broken lines on Figure 6. When the container 34 is moved to the charging position the stop 71 approaches and engages or is closely adjacent to stop 70, so that further movement of the container toward the left brings stop 71 into engagement with stop 70 and further movement is prevented. On the return stroke, the stop 71 is moved into engagement with or into a position closely adjacent to stop 69, so that further movement away from the open hearth furance brings stop 71 into contact with stop 69. Thus, the stops 69, 70 and 71 together prevent moving the container too far in either direction.

Before a furnace is charged, the charging machine 16 and the charging car 19 are moved into alignment with the open hearth furnace which is to be charged. The operator at the charging machine by manipulation of the customary controls moves the end of the peel outwardly toward the charging car and then moves the end of the peel downwardly between members 62 and 61 so that the end of the peel engages the notch edge 65. Then the peel is moved outwardly toward the furnace to move the container to the position indicated at A on Figure 3. The operator then raises the end of the peel from engagement with the bottom wall of the container and thereafter moves the peel further toward the furnace to move the movable wall across the container and push the contents into the furnace. Preferably the container extends into the furnace as shown in Figure 2. The pile of scrap in the furnace may at times reach up to the roof of the furnace above the hearth, and this scrap must be pushed back away from the doorway 12 to prevent the scrap from falling out of the doorway upon withdrawal of the charging container. After the material has been charged in the furnace, the operator withdraws the peel to retract the movable wall across the container. When the movable wall contacts the stops 68, further movement of the peel retracts the container to the normal or retracted position, the end of the peel is then raised free from the movable wall and the next car can be moved in the position.

With the present arrangement it is possible to quickly charge a large quantity of material into the furnace, for example, the present charging car may hold about twenty tons of relatively light weight scrap metal so that each cycle of operations described above will charge twenty tons of scrap into the furnace. The customary charging boxes will hold about a ton of scrap so that the present car is approximately twenty times faster. The size of the car will depend to a certain extent upon the size of the furnace including the furnace doorway 12.

While the present charging car has been described more particularly in connection with scrap metal, it is to be understood that other materials may be charged in the furnace. In addition, various modifications may be made in the charging car and in the plant arrangement and the present invention is not limited to the particular construction shown and described execpt as set forth in the claims.

I claim:

1. A charging car for charging material into an open hearth furnace, the charging car comprising wheeled frame means and container means for holding the material, means for mounting the container means on the frame means for lateral movement relative to the frame means from a normal position in which the container means is located generally above the frame means to a charging position in which the container means extends laterally outwardly from the frame means, the container means including a bottom wall and spaced apart fixed end walls, a movable side wall for the container means, means for mounting the movable side wall for movement across the container means to push the material out of the container means and into the open hearth furnace, laterally extending guide means on the bottom wall of the container means and roll means carried on the movable side wall and mounted on the guide means for supporting and guiding the movable wall during movement across the container means.

2. A charging car for charging material into an open hearth furnace, the charging car comprising wheeled frame means and container means for holding the material, means for mounting the container means on the frame means for lateral movement relative to the frame means from a normal position in which the container means is located generally above the frame means to a charging position in which the container means extends laterally outwardly from the frame means and from the charging position to the normal position, the container means including a bottom wall and spaced apart end walls mounted on the bottom wall, a movable wall mounted at one side of the container means, means for mounting the movable wall for movement from the one side of the container means across the bottom wall between the end walls to the other side of the container means to push the material out of the container means and into the open hearth furnace and for movement from the other side of the container means to the one side of the container means, spaced apart stops mounted on the frame means, stop means mounted on the container means between the spaced apart stops with the stop means on the container means and the spaced apart stops on the frame means being arranged to prevent movement of the container means in one direction laterally outwardly beyond the charging position and being positioned to prevent movement of the container means in the opposite directon beyond the normal postion, and second stop means mounted on the container means in the path of movement of the movable wall from the other side to the one side to effect movement of the container means from the charging position to the normal position.

3. A charging car for charging material into an open hearth furnace, the charging car comprising wheeled frame means, container means for holding the material, means for mounting the container means on the frame means for lateral movement relative to the container means between a normal position in which the container means is located generally above the container means and a charging position in which the container means extends laterally outwardly from the frame means, the container means including a bottom wall and spaced apart end walls mounted on the bottom wall, a movable wall mounted at one side of the container means, means for mounting the movable wall for movement from the one side of the container means across the bottom wall between the end walls to the other side of the container means to push the material out of the container means and into the open hearth furnace, spaced apart stops mounted on the frame means, stop means mounted on the container means between the spaced apart stops with the stop means on the container means and the spaced apart stops on the frame means being arranged to prevent movement of the container means in one direction laterally outwardly beyond the charging position and being arranged to prevent movement of the container means in the opposite direction beyond the normal position, guide rail means mounted on the bottom wall of the container means and roll means carried by the movable walls and mounted for movement along the guide means.

4. A charging car for charging material into an open hearth furnace, the charging car comprising wheeled frame means, container means for holding the material, means for mounting the container means on the frame means for lateral movement relative to the frame means from a normal position, in which the container means is located generally above the frame means to a charging position in which the container means extends laterally outwardly from the frame means, the container means including a bottom wall and spaced apart end walls mounted on the bottom wall, a movable wall mounted at one side of the container means, means for mounting the movable wall for movement from the one side of the container means across the bottom wall between the end walls to the other side of the container means to push the material out of the container means and into the open hearth furnace, spaced apart stops mounted on the frame means, stop means mounted on the container means between the spaced apart stops with the stop means on the container means and the spaced apart stops on the frame means being arranged to prevent movement of the container means in one direction laterally outwardly beyond the charging position and being arranged to prevent movement of the container means in the other direction beyond the normal position, and hold-down means mounted on the ends of the frame means to engage respective upper surfaces on the container means for preventing tilting of the container means when moved to the charging position.

5. In an open hearth furnace plant comprising an open hearth furnace having a charging opening in the front wall of the furnace communicating with the interior of the furnace, the charging opening having a length dimension extending longitudinally of the furnace, the length dimension of the charging opening being substantially greater than the height of the charging opening, and car rails spaced from the front wall of the furnace and extending in parallel relation therewith, a charging car adapted to be mounted on the car rails for movement along the car rails into a position in front of the charging opening, the charging car including a frame, container means for holding a charge of material supported on the frame, the container means including a bottom wall having a length dimension slightly less than the length of the charging opening and a width dimension substantially less than the length dimension, upstanding end walls joined to the bottom wall and spaced from each other a distance slightly less than the length of the charging opening, a movable front side wall structure at the furnace side of the container means, a movable rear side wall structure at the other side of the container means, means for mounting the container means on the frame for movement in a direction transversely of the length of the furnace from a normal position in which the front side edge of the bottom wall is spaced from the charging opening to a charging position in which the front side edge of the bottom wall extends into the charging opening, means for mounting the movable rear side wall structure for transverse sliding movement relative to the bottom wall and the end walls in a direction toward the charging opening substantially throughout the width of the container means, means for moving the container means including the movable rear side wall structure from the normal position to the charging position, and means for moving the movable rear side wall structure relative to the bottom wall in a direction toward the charging opening.

6. In an open hearth furnace plant comprising an open hearth furnace having a charging opening in the front wall of the furnace communicating with the interior of the furnace, the charging opening having a length dimension extending longitudinally of the furnace, the length dimension of the charging opening being substantially greater than the height of the charging opening, and car rails spaced from the front wall of the furnace and extending in parallel relation therewith, a charging car adapted to be mounted on the car rails for movement along the car rails into a position in front of the charging opening, the charging car including a frame, container means for holding a charge of material supported on the frame, the container means including a bottom wall having a length dimension slightly less than the length of the charging opening and a width dimension substantially less than the length dimension, upstanding end walls joined to the bottom wall and spaced from each other a distance slightly less than the length of the charging opening, a movable front side wall structure at the furnace side of the container means, a movable rear side wall structure at the other side of the container means, means for mounting the container means on the frame for movement in a direction transversely of the length of the furnace from a normal position in which the front side edge of the bottom wall is spaced from the charging opening to a charging position in which the front side edge of the bottom wall extends into the charging opening, means for mounting the movable rear side wall structure for transverse sliding movement relative to the bottom wall and the end walls in a direction toward the charging opening substantially throughout the width of the container means, means for moving the container means including the movable rear side wall structure from the normal position to the charging position, means for moving the movable rear side wall structure relative to the bottom wall in a direction toward the charging opening, and roll means mounted on the frame for supporting the container means during movement of the container means between the normal position and the charging position.

7. In an open hearth furnace plant comprising an open hearth furnace having a charging opening in the front wall of the furnace communicating with the interior of the furnace, the charging opening having a length dimension extending longitudinally of the furnace, the length dimension of the charging opening being substantially greater than the height of the charging opening, and car rails spaced from the front wall of the furnace and extending in parallel relation therewith, a charging car adapted to be mounted on the car rails for movement along the car rails into a position in front of the charging opening, the charging car including a frame, container means for holding a charge of material supported on the frame, the container means including a bottom wall having a length dimension slightly less than the length of the charging opening and a width dimension substantially less than the length dimension, upstanding end walls joined to the bottom wall and spaced from each other a distance slightly less than the length of the charging opening, a movable front side wall structure at the furnace side of the container means, a movable rear side wall structure at the other side of the container means, means for mounting the container means on the frame for movement in a direction transversely of the length of the furnace from a normal position in which the front side edge of the bottom wall is spaced from the charging opening to a charging position in which the front side edge of the bottom wall extends into the charging opening, means for mounting the movable rear side wall structure for transverse sliding movement relative to the bottom wall and the end walls in a direction toward the charging opening substantially throughout the width of the container means, means for moving the container means including the movable rear side wall structure from the normal position to the charging position, means for moving the movable rear side wall structure relative to the bottom wall in a direction toward the charging opening, spaced stops mounted on the frame and stop means mounted on the container means between the spaced stops on the frame means, the spaced stop means being located to establish the normal position of the container means in which the container means is located over the frame means and to establish the charging position of the container means in which the front side edge of the bottom wall of the container means extends outwardly from the charging car into the charging opening.

References Cited in the file of this patent

UNITED STATES PATENTS

| | | |
|---|---|---|
| 421,797 | Wellman | Feb. 18, 1890 |
| 780,203 | Ladd | Jan. 17, 1905 |
| 2,606,015 | Brooke | Aug. 5, 1952 |

FOREIGN PATENTS

| | | |
|---|---|---|
| 113,027 | Germany | Aug. 30, 1900 |
| 3,252 | Great Britain | Feb. 16, 1905 |
| 606,445 | Great Britain | Aug. 13, 1948 |